G. Westinghouse,

Horse Power,

No. 900, Reissued Feb. 14, 1860.

AM. PHOTO-LITHO. CO. N.Y. (OSBORNE'S PROCESS)

UNITED STATES PATENT OFFICE.

GEORGE WESTINGHOUSE, OF SCHENECTADY, NEW YORK.

IMPROVEMENT IN ENDLESS-CHAIN HORSE-POWERS.

Specification forming part of Letters Patent No. 11,104, dated June 13, 1854; Reissue No. 317, dated July 10, 1855; Reissue No. 900, dated February 14, 1860.

*To all whom it may concern:*

Be it known that I, GEORGE WESTINGHOUSE, formerly of Central Bridge, in the county of Schoharie and State of New York, but now of the city and county of Schenectady, in the same State, have invented certain new and useful Improvements in Endless-Chain Horse-Powers, of which the following is a full, clear, and exact description, reference being had to the accompanying drawings, which make part of this specification, and in which—

Figure 1:
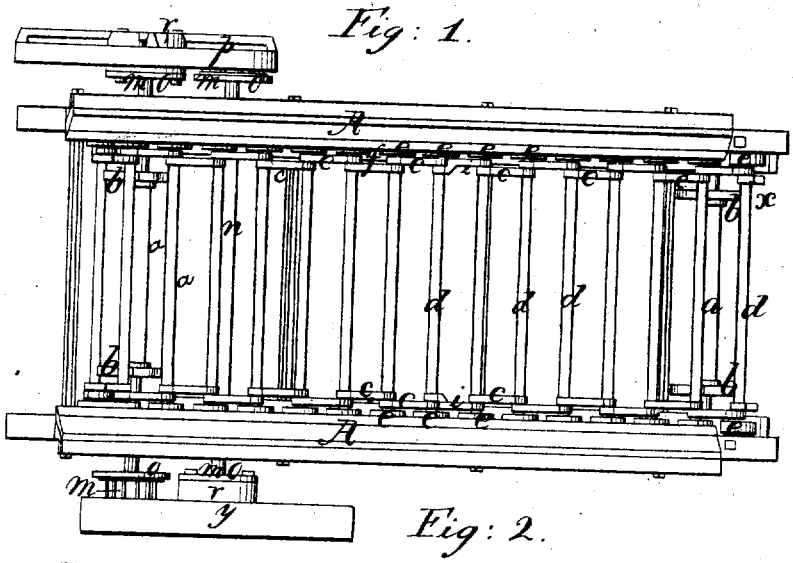
Figure 2:
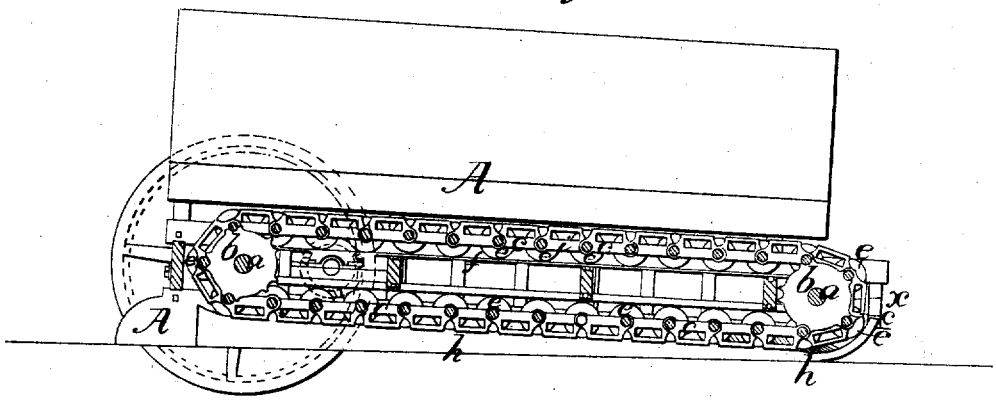

Figure 1 represents a plan or top view of an endless-chain horse-power embracing my improvements, and Fig. 2 represents a vertical longitudinal section through the same at the line *y y* of Fig. 1.

My improvements consist in a method of constructing, attaching, and applying the gearing and chain, by which I secure a cheap, durable, and efficient structure, and am also enabled to equalize the tension of the endless chain so that it shall at all times be equally taut, or nearly so. My invention further consists in securing the driving and band wheels to their respective shafts in such manner that they can readily be removed and replaced, or transferred from one to the other.

In the accompanying drawings, the frame A of the machine is represented as constructed in the manner and of the dimensions of the most approved endless-chain horse-powers. Near each end of the frame shafts *a a'* are placed, bearing the carrying-reels *b*. These reels are of minimum size, and their circumference is equal in length to five links of the endless chain. By thus reducing the carrying-reels to a size far below any ever before used practically, I am enabled to diminish very materially the height of the machine, the value of which improvement will readily be appreciated by every constructer of horse-powers; and this, together with a peculiarity in the construction of the endless chain hereinafter described, enables me to secure at all times an equable tension upon the chain such as has never before been effected.

The reels *b* have an odd number of projections (say, five) to receive the rods *d* of the endless chain. This chain is made with links *c*, uniting a series of parallel rods or axles, *d*, upon the ends of which are secured pulleys or friction-rollers *e*, of the ordinary construction. These pulleys traverse a rail on each side of the frame, as shown in Fig. 2, in the usual manner, *f* representing the upper, and *h* the lower, rail.

The peculiarity in the construction of my chain which distinguishes it from all others is the introduction of an odd link, *i*, in each side of the endless chain. The ordinary links *c* are straight in their top view, (see Fig. 1,) and are placed alternately in and out with respect to the ends of the bars *d*; but the odd links *i* have one of their ends placed outside of the adjacent ordinary link and the other inside of the ordinary link at the other end, the link *i* itself being bent inward, with a jog at that point; or, in other words, being cast of a pattern different from the others horizontally, while it retains its general configuration vertically, as shown in Fig. 2. By means of these odd links *i*, I am enabled to place the carrying-reels *b* in such positions relative to each other that the projections of one set of reels (for receiving the rods *d* of the chain) shall always be opposite the flat sides of the other set. This relative position of the reels is clearly shown in Fig. 2. By this device the chain is kept taut and prevented from sagging and striking the lower rail, *h*, as it does in horse-powers where this device does not exist.

Each end of the driving-shaft *a* projects beyond the frame, and has a hub or pinion, *m*, affixed to it. A counter-shaft, *n*, is arranged parallel to the driving shafts, with which it corresponds in length. It likewise carries a hub or pinion, *m'*, upon each end. These four hubs or pinions *m m'* may be of the same size and pattern on their peripheries, and have flanges or rims *o* secured to their inner faces and extending beyond their cogs or projections. By means of these flanges the band and driving wheels are firmly secured in their respective places. This mode of securing the wheel to its shaft is clearly shown in Fig. 1.

The driving-wheel *p* has an internal gear, (or cogs on the inside of its rim,) and may be so arranged as to run on either shaft or to gear with either pinion on the counter-shaft. The arms of this wheel are joined to the outside of the rim, as is usual with internal gear-wheels, and are connected with a hub, *r*, which is securely keyed to the shaft and up against the flange *o* by two or more bolts, *z z*, which pass through the flange and hub (or between the cogs of the pinions) to unite the wheel securely to the shaft. Two bolts will generally be found sufficient for this purpose; but more may be used if deemed necessary. These bolts hold the wheels to the hubs or pinions much more securely than when only one bolt at the center of the wheel is used, as they are not liable to become loosened by the working of the wheel, as is the case with center fastenings. Moreover, this manner of fastening by bolts at or near the periphery of the hubs enables a governor to be attached to the band-wheel without the necessity of removing it every time the band-wheel is to be taken off the power, as is the case with those above named. The bolts *z z* may either be screwed into the hubs or pinions or pass through and be fastened by nuts *s s*, or with a key.

By this method of construction it will be seen that the wheels may readily be shifted to either end of the shafts in an expeditious manner and securely fastened thereon without the labor or difficulty of keying the hubs or pinions on or off. As the driving-wheel can be used as long as any one of the pinions lasts, the importance, utility, and economy of this arrangement is manifest.

The internal gearing adopted by me has long been known and used, but the peculiar construction of its parts is my invention.

Having thus described my improved endless-chain horse-power, what I claim therein as new, and desire to secure by Letters Patent, is—

1. The combination of the straight links *c* and odd links *i*, when constructed, arranged, and operating as described.

2. The combination and arrangement of the hubs or pinions *m m'* with the band and driving wheels, as described, for the purposes set forth.

In testimony whereof I have hereunto signed my name.

GEORGE WESTINGHOUSE.

Witnesses:
WM. D. BALDWIN,
JOHN S. HOLLINGSHEAD.